United States Patent
Fornahl

(10) Patent No.: US 9,001,426 B2
(45) Date of Patent: Apr. 7, 2015

(54) BEAM FORMING DEVICE FOR LASER DIODE ARRAYS

(75) Inventor: Udo Fornahl, Münster (DE)

(73) Assignee: LIMO Patentverwaltung GmbH & Co. KG, Dortmund (DE)

( * ) Notice: Subject to any disclaimer, the term of this patent is extended or adjusted under 35 U.S.C. 154(b) by 925 days.

(21) Appl. No.: 13/146,122

(22) PCT Filed: Jan. 21, 2010

(86) PCT No.: PCT/EP2010/000344
§ 371 (c)(1),
(2), (4) Date: Aug. 9, 2011

(87) PCT Pub. No.: WO2010/084001
PCT Pub. Date: Jul. 29, 2010

(65) Prior Publication Data
US 2011/0286101 A1  Nov. 24, 2011

(30) Foreign Application Priority Data
Jan. 23, 2009 (DE) .......................... 10 2009 005 963

(51) Int. Cl.
*G02B 27/10* (2006.01)
*G02B 19/00* (2006.01)
*G02B 27/09* (2006.01)

(52) U.S. Cl.
CPC ........ *G02B 19/0066* (2013.01); *G02B 27/0961* (2013.01); *G02B 27/0977* (2013.01); *G02B 19/0009* (2013.01); *G02B 19/0028* (2013.01); *G02B 19/0014* (2013.01)

(58) Field of Classification Search
CPC .. G02B 3/0056; G02B 17/086; G02B 3/0031; G02B 27/144; G02B 27/145; G02B 27/126; G02B 5/04; G02B 27/30; G02B 27/09
USPC ......... 359/627, 619, 629, 640, 641, 833, 834, 359/836, 837
See application file for complete search history.

(56) References Cited

U.S. PATENT DOCUMENTS

| | | | |
|---|---|---|---|
| 5,808,323 A | 9/1998 | Spaeth et al. | |
| 6,471,372 B1 | 10/2002 | Lissotschenko et al. | |
| 6,816,318 B2 | 11/2004 | Mikhailov | |
| 7,384,159 B2 * | 6/2008 | Takeda | ........................... 353/94 |
| 7,653,115 B2 | 1/2010 | Yamaguchi et al. | |
| 7,986,461 B2 | 7/2011 | Bartoschewski | |
| 2004/0233964 A1 | 11/2004 | Yamanaka et al. | |
| 2006/0120075 A1 | 6/2006 | Takeda | |

FOREIGN PATENT DOCUMENTS

| | | |
|---|---|---|
| DE | 10106155 A1 | 8/2002 |
| DE | 102007061358 A1 | 7/2009 |
| EP | 0735397 A2 | 10/1996 |
| EP | 0961152 A1 | 12/1999 |
| EP | 1006382 A1 | 6/2000 |
| EP | 1376197 A1 | 1/2004 |
| WO | 2005085934 A1 | 9/2005 |

* cited by examiner

Primary Examiner — James Greece
(74) Attorney, Agent, or Firm — Laurence A. Greenberg; Werner H. Stemer; Ralph E. Locher

(57) ABSTRACT

A device forms laser radiation which has partial beams interspaced in a first direction that is perpendicular to the direction of propagation of the laser radiation, especially for forming laser radiation which is emitted by a laser diode bar. The device contains a plurality of reflective surfaces on which at least one of the interspaced partial beams can be reflected in such a manner that the distances of the partial beams are smaller relative to each other after reflection than before reflection.

10 Claims, 4 Drawing Sheets

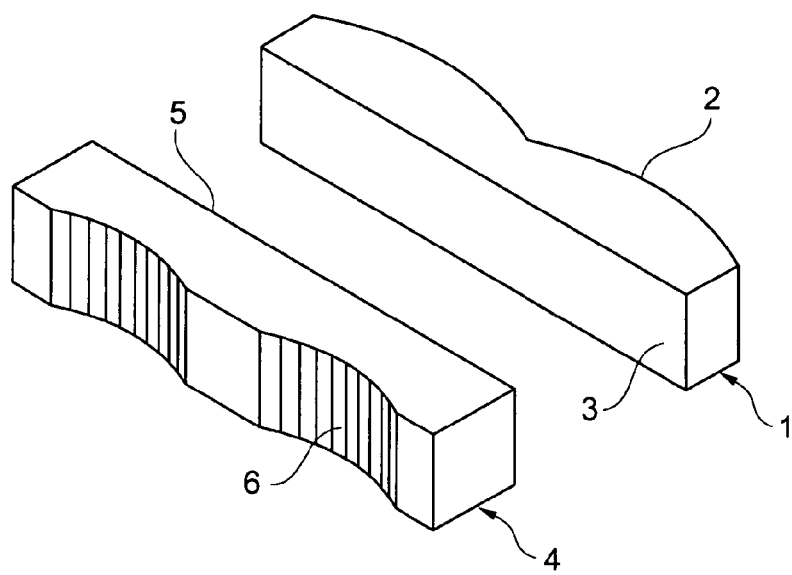
FIG. 1
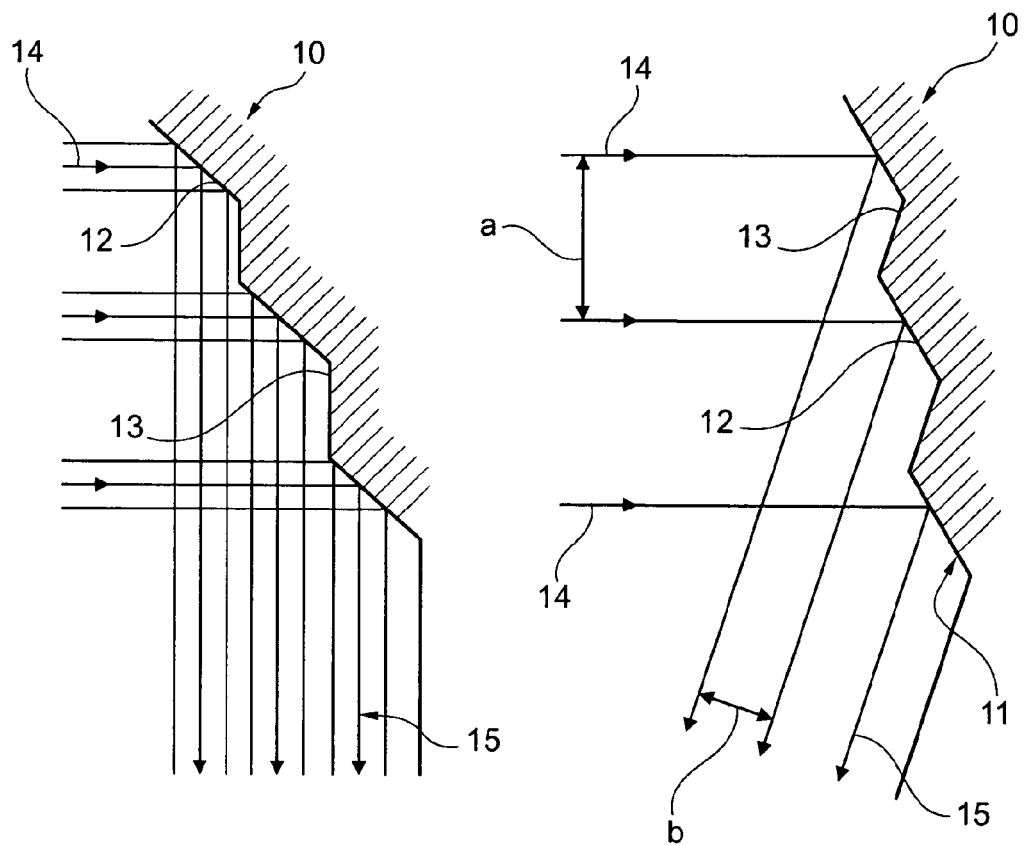
FIG. 3
FIG. 2

BEAM FORMING DEVICE FOR LASER DIODE ARRAYS

BACKGROUND OF THE INVENTION

Field of the Invention

The present invention relates to a device for shaping laser radiation having partial beams spaced apart from one another in a first direction, which is perpendicular to the propagation direction of the laser radiation, in particular for shaping laser radiation that emerges from a laser diode bar.

Definitions: in the propagation direction of the light to be influenced means the average propagation direction of the light, particularly if the latter is not a plane wave or is at least partly convergent or divergent. Light beam, partial beam or beam, unless expressly indicated otherwise, does not mean an idealized beam from geometric optics, but rather a real light beam, such as a laser beam having a Gaussian profile, for example, which has an extended beam cross section rather than an infinitesimally small beam cross section.

Laser diode bars have a plurality of emitters, for example 19 emitters, which are arranged in a manner spaced apart from one another in the so-called slow axis. The slow axis is the first direction mentioned in the introduction, in which the active layer of the semiconductor diode extends, whereas the fast axis is the direction perpendicular thereto. By way of example, each of the emitters has a length of approximately 150 µm in the slow axis, wherein the distance between two adjacent emitters in this direction is approximately 400 µm. That has the consequence that dark regions are present between the partial beams emerging from the individual emitters, said dark regions proving to be disadvantageous for the brightness (specific intensity) of the laser radiation.

In the prior art, the partial beams of the laser diode bars which emerge from the individual emitters are collimated by micro-optics in the fast axis and partly also in the slow axis without the periodicity of the beams of the individual emitters being manipulated in this case. One example of this is found in WO 2005/085934 A1. In this prior art, accordingly, depending on the application purpose, further beam-shaping optics are used in order to obtain a specific beam profile. In this case, the dark region between the emitters is accepted, which sets a limit on the brightness that can be obtained. Consequently, a structurally imposed limit for the brightness of the entire laser system arises on account of the bar structure, said limit being countably distant from the physical limit.

A further example of a beam-shaping optical unit is found in DE 101 06 155 A1, where the laser radiation emerging from a laser diode bar is split into two parts in the slow axis, wherein these parts are subsequently arranged one above the other in the fast axis. As a result, the cross section of the laser radiation is converted from an elongated rectangular form into a less elongated rectangular form, which can be better focused onto the end of an optical fiber.

A further example of a beam-shaping optical unit is found in German patent application 10 2007 061 358. 1, which has not been published heretofore. The device described therein is depicted in FIG. 1 and comprises a first substrate 1 having a first refractive interface 2, which serves as an entrance surface and which can deflect at least a plurality of the partial beams of the laser radiation to be shaped differently in such a way that they run at least partly more convergently with respect to one another after passage through the first interface than before passage through the first interface. The exit surface 3 of the first substrate 1 is embodied in plane fashion. The device furthermore comprises a second substrate 4 having a plane entrance surface 5 and an exit surface, which serves as a second refractive interface 6 and through which the laser radiation that has passed through the first interface 2 can pass, wherein the second interface 6 can deflect at least some of the partial beams in such a way that the convergence thereof is reduced. In this case, as a result of reducing or eliminating the distance between the partial beams in the first direction, it is possible for the dark region between the individual partial beams to be reduced in size, such that the brightness that can be obtained can be brought closer to the physical limit.

The two refractive interfaces 2, 6 are structured and have, in particular, a multiplicity of surfaces inclined with respect to one another. On account of the fact that two structured surfaces are provided, a low effectiveness (performance) of the device known from the prior art arises on account of shape deviations and microroughnesses of these structured surfaces.

BRIEF SUMMARY OF THE INVENTION

The problem addressed by the present invention is that of providing a device of the type mentioned in the introduction which is more effective.

In accordance with the invention, it is provided that a device contains a plurality of reflective surfaces at which in each case at least one of the partial beams spaced apart from one another can be reflected in such a way that the distances between the partial beams are smaller after reflection than before reflection. On account of the fact that rather than two substrates with two structured surfaces being provided, in particular only one substrate with one structured surface is provided, which surface forms the plurality of reflective surfaces, a series of advantages are afforded. Firstly, the production costs can be reduced. Secondly, on account of the reduction of the number of structured surfaces, the faults can be reduced and the effectiveness (performance) can thus be increased.

In accordance with another embodiment of the invention, it is provided that the device contains a substrate having a first refractive interface, which serves as an entrance surface, and a second refractive interface, which serves as an exit surface, wherein the first and/or the second interface are/is configured in such a way that the distances between the partial beams are smaller after passage through the substrate than before said passage.

In this case, in particular, only one of the two interface is structured, whereas the other of the two interfaces is plane. The same advantages as discussed above are afforded as a result.

Furthermore, the device can be configured such that the beam parameters of the laser radiation can be altered.

In accordance with a further preferred configuration of the embodiment in accordance with the invention, it can be provided that the substrate can rotate the partial beams, in particular can rotate them by 90° about the propagation direction. By way of example, in this case, each of the two interfaces can have a plurality of cylindrical lenses, the cylinder axes of which are inclined, preferably inclined by 45°, with respect to the direction in which the partial beams are arranged alongside one another. In this way, the device, in addition to reducing the distances between the partial beams, can perform the function of beam rotation, which is fulfilled for example by the device in accordance with EP 1 006 382 A.

Further features and advantages of the present invention will become clear from the following description of preferred exemplary embodiments with reference to the accompanying drawings, in which:

BRIEF DESCRIPTION OF THE SEVERAL VIEWS OF THE DRAWING

FIG. 1 shows a perspective view of a device for shaping laser radiation in accordance with DE 10 2007 061 358.1;

FIG. 2 shows a schematic detail view of a first embodiment of a device according to the invention;

FIG. 3 shows a schematic detail view of a second embodiment of a device according to the invention;

In the figures, identical or functionally identical parts are provided with identical reference symbols.

DESCRIPTION OF THE INVENTION

Figure 4:
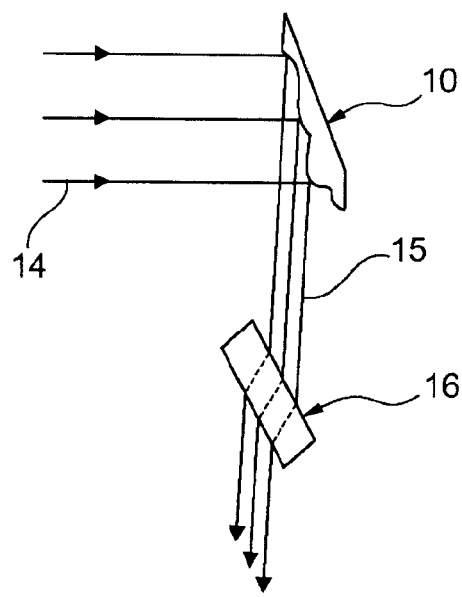
FIG. 4 shows a further schematic view of the first or respectively the second embodiment of a device according to the invention.

FIG. 2 shows a device comprising a substrate 10, which has a structured surface 11. Said structured surface 11 forms a plurality of reflective surfaces 12, between which steps 13 are arranged.

Instead of one substrate 10, it is also possible for a plurality of substrates to be provided, which have in each case at least one structured surface at which in each case a plurality of reflective surfaces are formed.

Partial beams 14 incident from the left in FIG. 2 impinge on the reflective surfaces 12 and are reflected from the latter downward in FIG. 2. As a result of the steps 13 between the reflective surfaces 12, the distance a between the partial beams 14 before reflection is reduced with respect to a distance b between the reflected partial beams 15 after reflection.

FIG. 3 shows a comparable device. The distance b between the reflected partial beams 15 can be influenced by the height of the steps 13.

The reflective surfaces 12 can be metal mirrors or glass having a highly reflective coating. There is also the possibility of using other materials such as semiconductors or ceramics. Furthermore, the reflections at the reflective surfaces can also be effected by total internal reflections.

On account of the individual partial beams 14, 15 having beam paths of different lengths, a slanted slow-axis collimation means 16 is arranged downstream of the substrate 10 (see FIG. 4). The beam paths of different lengths are taken into account and compensated for by the slanted positioning. In this case, the slow-axis collimation means 16 can be embodied in aspherical fashion.

There is also the possibility of arranging a slow-axis collimation means upstream of the substrate 10, although said collimation means is not slanted in this case.

Figure 5:
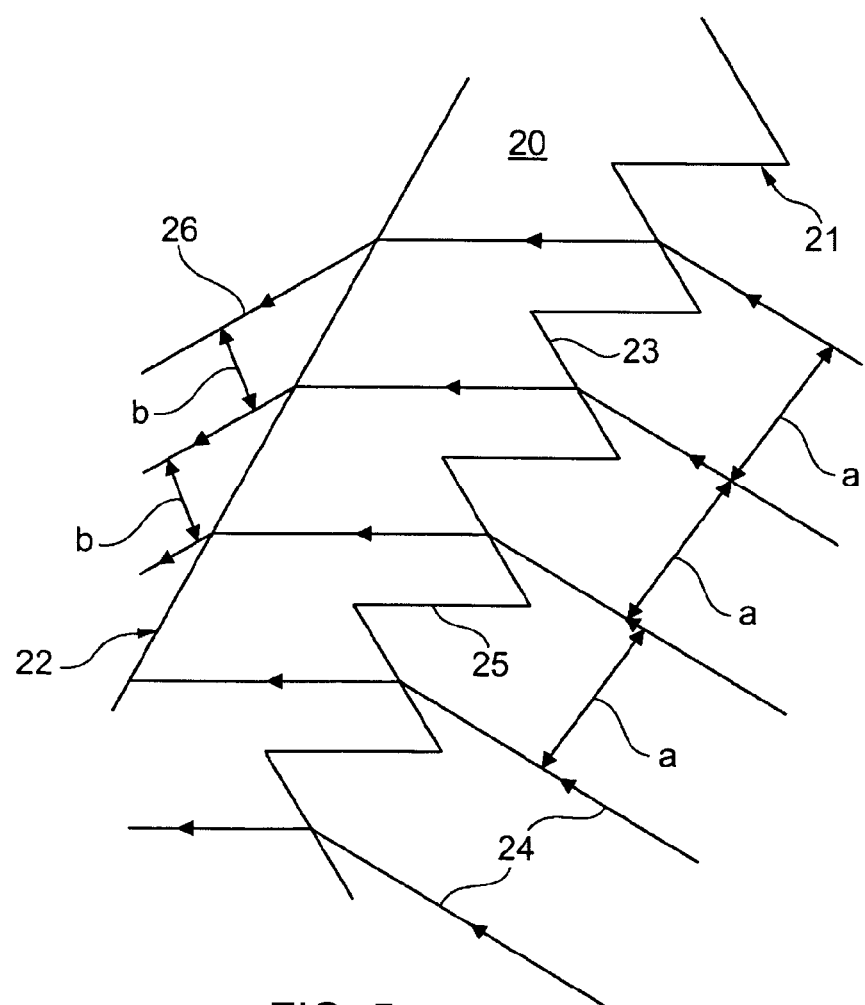
FIG. 5 shows a schematic detail view of a third embodiment of a device according to the invention.

In the case of the embodiment in accordance with FIG. 5, a transparent substrate 20 is provided, which comprises a structured first interface 21, which serves as an entrance surface, and a plane second interface 22, which serves as an exit surface. The first interface 21 has prism sections 23 on which the incident partial beams 24 impinge. In the exemplary embodiment depicted, the prism sections 23 correspond to one another and are oriented parallel to one another. The partial beams 24 are refracted by the prism sections 23 in such a way that they run parallel to the imaginary base surface 25 of the prism sections 23 within the substrate. After repeated refraction at the plane second interface 22, the distance a between the partial beams 24 prior to passage through the substrate is reduced with respect to the distance b between the partial beams 26.

In the case of the abovementioned beam course parallel to one another or to the imaginary prism base surfaces, the beam parameters of the partial beams are not altered.

By altering the topology of the first and/or the second interface, the beam parameters can be altered.

By way of example, the beams can have a smaller divergence with a larger diameter or vice versa. In this case, there is indeed the possibility that the prism sections 23 and base surfaces are embodied in such a way that, or the partial beams 24 impinge on the prism sections 23 at an angle such that, the partial beams 24 do not run parallel to the base surfaces 25 within the substrate.

For the collimation of the partial beams 24, 26, a slanted slow-axis collimation means is likewise expedient as a result of the beam paths of different lengths.

Figure 6:
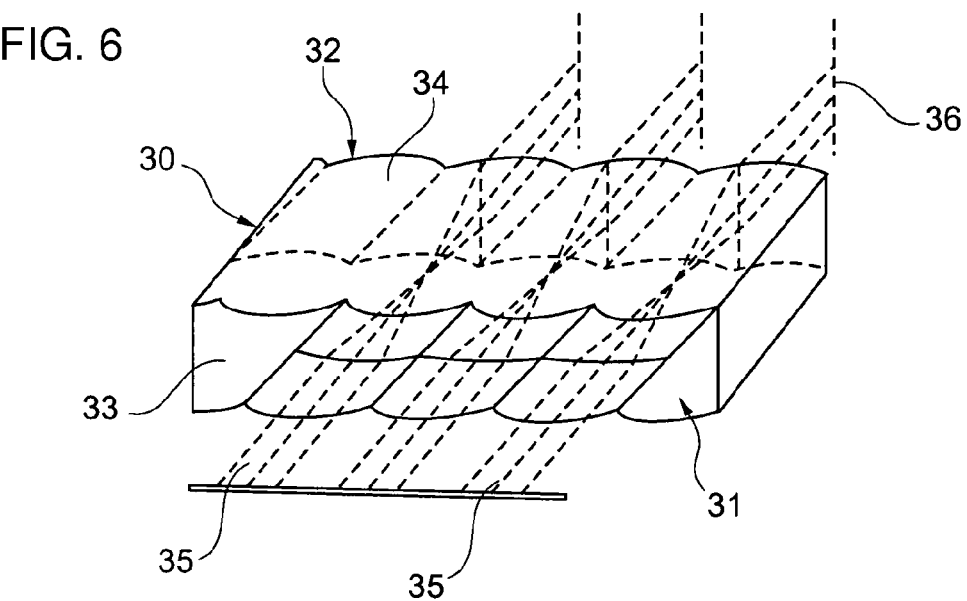
FIG. 6 shows a perspective view of a device for beam rotation in accordance with EP 1 006 382 A.

FIG. 6 shows a perspective view of a device for beam rotation in accordance with EP 1 006 382 A. Said device comprises a substrate 30 having a structured first interface 31, which serves as an entrance surface, and a structured second interface 32, which serves as an exit surface, wherein each of the interface 31, 32 has a plurality of cylindrical lenses 33, 34 arranged at an angle of 45° with respect to the direction in which the partial beams 35 are arranged alongside one another.

The cylindrical lenses 33, 34 of the interface 31, 32 form a telescope arrangement. A respective one of the partial beams 35 impinges on one of the cylindrical lenses 33. By means of a device of this type, the partial beams 35 are rotated by 90° about the propagation direction (see the rotated partial beams 36 in FIG. 6).

Figure 7:
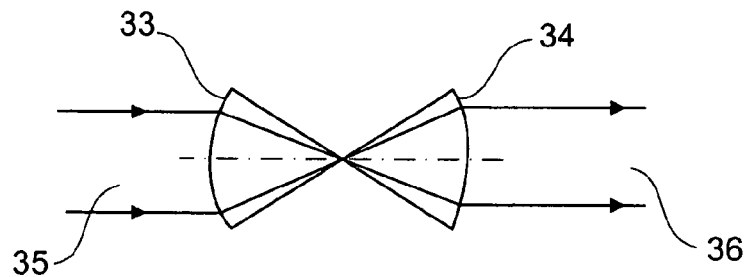
FIG. 7 shows an exemplary beam path in the case of a centrally impinging partial beam.
Figure 8:
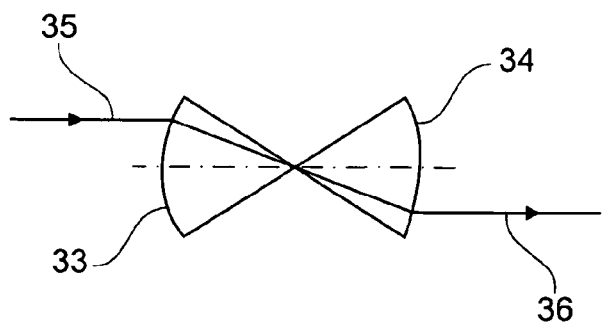
FIG. 8 shows an exemplary beam path in the case of an eccentrically impinging partial beam.
Figure 9:
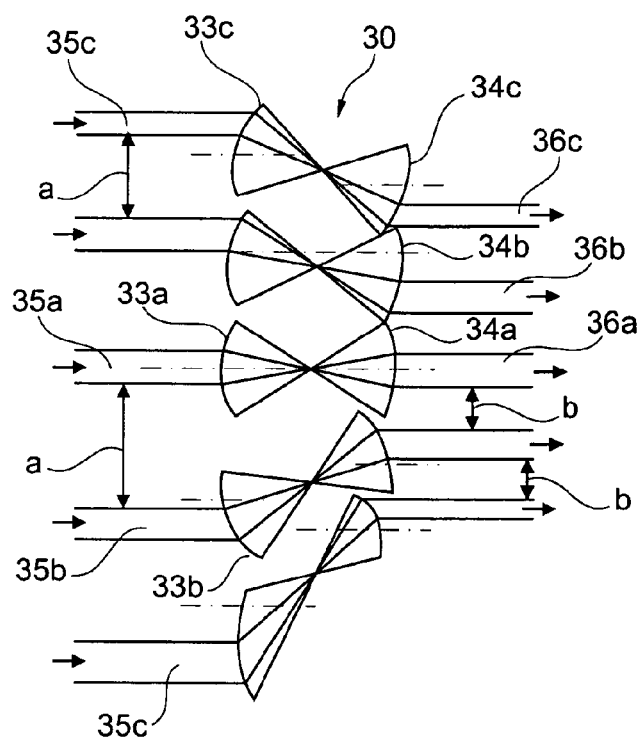
FIG. 9 shows a schematic detail view of a fourth embodiment of a device according to the invention.

FIG. 7 shows that a partial beam 35 impinging centrally on one of the cylindrical lenses 33 also leaves the opposite cylindrical lens 34 centrally again as a partial beam 36. FIG. 8 shows that a partial beam 35 impinging eccentrically, in particular here above the center, likewise leaves the opposite cylindrical lens 34 eccentrically again, although here below the center, as a partial beam 36. This effect is exploited by the fourth embodiment of a device according to the invention, as depicted in FIG. 9.

The cylindrical lenses 33 on the first interface 31 are extended and arranged in such a way that although the central partial beam 35$a$ impinges centrally on the corresponding cylindrical lens 33$a$, the partial beams 35$b$, 35$c$ arranged further above and further below impinge eccentrically. In particular, the degree of eccentricity increases with increasing distance from the center of the first interface 31.

As a result, the partial beams 35$b$, 35$c$ are deflected toward the center, such that they emerge from the correspondingly extended and arranged cylindrical lenses 34$a$, 34$b$, 34$c$ closer to one another. The distances a between the partial beams 35$a$, 35$b$, 35$c$ before passage through the lenses are therefore reduced to the distances b between the partial beams 36$a$, 36$b$, 36$c$. In this case, the pitch (center-to-center distance) of the cylindrical lenses 34*a*, 34*b*, 34*c* is smaller than that of the cylindrical lenses 33*a*, 33*b*, 33*c* because the partial beams move closer together.

Figure 10:
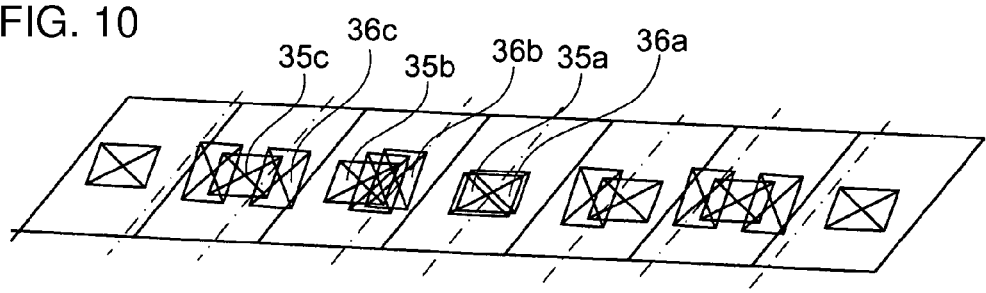
FIG. 10 shows a front view of the fourth embodiment.

FIG. 10 schematically shows the displacement of the emerging partial beams 36*a*, 36*b*, 36*c* relative to the entering partial beams 35*a*, 35*b*, 35*c* inward.

The invention claimed is:

1. A device for shaping laser radiation formed from partial beams spaced apart from one another in a first direction, being perpendicular to a propagation direction of the laser radiation, including for shaping the laser radiation that emerges from a laser diode bar, the device comprising:

a substrate having a first refractive interface serving as an entrance surface, and a second refractive interface serving as an exit surface, at least one of said first or second interfaces is configured such that distances between the partial beams are smaller after passage through said substrate than before the passage through said substrate, said substrate rotating the partial beams, each of said first and second interfaces having a plurality of cylindrical lenses, spaced apart from one another with respect to the first direction and having cylindrical axes being inclined with respect to the first direction, said cylindrical lenses are configured such that the partial beams impinge centrally on at least one first of said cylindrical lenses disposed in a center of said first and second interfaces, whereas the partial beams impinge eccentrically on at least one second said cylindrical lenses disposed outside said center of said first and second interfaces, said first and second cylindrical lenses being different from one another.

2. The device according to claim 1, wherein only one of said first and second interfaces is a structured interface, and the other of said first and second interfaces is a plane interface.

3. The device according to claim 2, wherein said structured interface has a plurality of prism sections.

4. The device according to claim 3, wherein said prism sections correspond to one another and are oriented parallel to one another.

5. The device according to claim 3, wherein said prism sections are embodied differently than one another.

6. The device according to claim 3, wherein said prism sections have base surfaces and individual ones of the partial beams run one of parallel or in an inclined fashion with respect to said base surfaces.

7. The device according to claim 1, further comprising a slow-axis collimation device disposed downstream of said substrate in the propagation direction of the laser radiation, said slow-axis collimation device being inclined with respect to the propagation direction.

8. The device according to claim 1, wherein said cylindrical lenses are configured such that the distances between the partial beams are smaller after passage through said substrate than before the passage through said substrate.

9. The device according to claim 1, wherein said substrate can rotate the partial beams by 90° about the propagation direction.

10. The device according to claim 1, wherein said cylindrical lenses are inclined by 45°.

\* \* \* \* \*